(12) United States Patent
Liang et al.

(10) Patent No.: US 11,180,128 B2
(45) Date of Patent: Nov. 23, 2021

(54) SYSTEM AND METHOD FOR CONTROLLING CENTRALIZED BRAKE OF VEHICLES, A MOTOR TRAIN SET BRAKE CONTROL SYSTEM

(71) Applicant: CRRC TANGSHAN CO., LTD., Hebei (CN)

(72) Inventors: Jianquan Liang, Tangshan (CN); Li Si, Tangshan (CN); Zhonghua Liu, Tangshan (CN); Li Li, Tangshan (CN); Xinyong Zhang, Tangshan (CN); Lei Chen, Tangshan (CN); Dongdong Zhang, Tangshan (CN); Xingwang Zhang, Tangshan (CN); Huizhi Sun, Tangshan (CN); Shan Gao, Tangshan (CN); Shuyu Lu, Tangshan (CN)

(73) Assignee: CRRC TANGSHAN CO., LTD., Hebei (CN)

( * ) Notice: Subject to any disclaimer, the term of this patent is extended or adjusted under 35 U.S.C. 154(b) by 156 days.

(21) Appl. No.: 16/627,330

(22) PCT Filed: Jun. 29, 2018

(86) PCT No.: PCT/CN2018/093545
§ 371 (c)(1),
(2) Date: Dec. 29, 2019

(87) PCT Pub. No.: WO2019/024632
PCT Pub. Date: Feb. 7, 2019

(65) Prior Publication Data
US 2020/0164847 A1     May 28, 2020

(30) Foreign Application Priority Data
Aug. 3, 2017 (CN) .......................... 201710657029.0

(51) Int. Cl.
*B60T 13/66* (2006.01)
*B60T 17/22* (2006.01)
(Continued)

(52) U.S. Cl.
CPC .......... *B60T 13/665* (2013.01); *B60T 17/228* (2013.01); *B60L 2200/26* (2013.01);
(Continued)

(58) Field of Classification Search
CPC .. B60L 2200/26; B60T 8/1705; B60T 13/693; B60T 13/266; B60T 13/665;
(Continued)

(56) References Cited

U.S. PATENT DOCUMENTS 5,172,316 A * 12/1992 Root ...................... B60T 13/665
246/182 B
5,967,620 A * 10/1999 Truglio .................. B60T 13/665
303/15
(Continued)

FOREIGN PATENT DOCUMENTS

CN      201102538 Y     8/2008
CN      101423056 A     5/2009
(Continued)

OTHER PUBLICATIONS

English machined translation of CN-105564402, description only, May 11, 2016.*
(Continued)

*Primary Examiner* — Robert A. Siconolfi
*Assistant Examiner* — San M Aung
(74) *Attorney, Agent, or Firm* — Pattao, LLC; Junjie Feng

(57) ABSTRACT

A system for controlling centralized brake of vehicles, comprising: a pressure collection device for collecting the pressure of a main blast pipe and a train pipe control device. The pressure signal output end of the pressure collection
(Continued)

device is connected to the pressure signal input end of the train pipe control device; the brake signal input end of the train pipe control device is connected to the brake signal output end of a brake controller; the train pipe control device is pneumatically connected to the main blast pipe and a train pipe separately by means of an air channel. By means of the solution, the installation space of a trailer is reduced, and the costs are lowered. In addition, the change in the pressure of the train pipe is controlled by an automatic brake control system, the train can operate after being connected to an automatically air-braked coach, according to a brake request output by the brake controller and the detection of the real-time pressure of the train pipe, the change in the pressure of the train pipe is controlled, and a five-line control signal is used, so that flexible marshalling can be implemented.

20 Claims, 6 Drawing Sheets

(51) Int. Cl.
*B60T 13/68* (2006.01)
*B61H 11/10* (2006.01)
(52) U.S. Cl.
CPC ........... *B60T 13/662* (2013.01); *B60T 13/683* (2013.01); *B61H 11/10* (2013.01)
(58) Field of Classification Search
CPC .... B60T 13/683; B60T 13/662; B60T 17/228; B61H 11/06; B61H 13/00; B61H 11/10

USPC ........................................................... 303/3
See application file for complete search history.

(56) References Cited

U.S. PATENT DOCUMENTS

| | | | |
|---|---|---|---|
| 2002/0147538 A1* | 10/2002 | Marra | B60T 13/665 701/70 |
| 2002/0180264 A1 | 12/2002 | Moffitt | |
| 2003/0047991 A1* | 3/2003 | McCurdy, Jr. | B60T 13/665 303/11 |
| 2005/0085960 A1* | 4/2005 | Lumbis | B60T 13/683 701/19 |
| 2016/0318491 A1* | 11/2016 | Seaton | B60T 13/665 |

FOREIGN PATENT DOCUMENTS

| | | |
|---|---|---|
| CN | 105564402 A | 5/2016 |
| CN | 106740785 A | 5/2017 |

OTHER PUBLICATIONS

International Search Report in the international application No. PCT/CN2018/093545, dated Sep. 30, 2018.
English translation of the Written Opinion of the International Search Authority in the international application No. PCT/CN2018/093545, dated Sep. 30, 2018.

* cited by examiner

SYSTEM AND METHOD FOR CONTROLLING CENTRALIZED BRAKE OF VEHICLES, A MOTOR TRAIN SET BRAKE CONTROL SYSTEM

CROSS-REFERENCE TO RELATED APPLICATIONS

This application is a 35 U.S.C. 371 national stage filing of International Application No. PCT/CN2018/093545 filed Jun. 29, 2018, which claims priority to Chinese Patent Application No. 201710657029.0 filed Aug. 3, 2017. The entire contents of these above patent applications are hereby incorporated by reference in their entirety.

TECHNICAL FIELD

The present application relates to the control technology of rail transport, in particular to a centralized brake control system and method of a control car, and a brake control system of a high-speed train set.

BACKGROUND

The passenger trains in our country are mainly divided into two types, one is in the form of a combination of a locomotive and passenger cars, and the other is in the form of high-speed train set.

A brake control system of the formation form of the combination of the locomotive and passenger cars is mainly the brake control system of locomotive. At present, what is widely used for the locomotive is an automatic brake control system controlled by a microcomputer, which accurately controls, through the microcomputer, the pressure of a train pipe according to a braking instruction of a brake controller or a train monitoring system, and transfers a brake requirement of a train by means of a pressure change of the train pipe. The passenger car adopts an automatic electro-pneumatic brake, which generates the corresponding brake cylinder pressure according to the pressure change of the train pipe.

This control process requires cooperation with locomotive related devices like a traction system, so the control process is relatively complex, and the operation cost is relatively high.

A high-speed train set adopts a direct brake control system controlled by the microcomputer, which requires each car to be equipped with a Brake Control Unit (BCU). The braking instruction of the brake controller or the train monitoring system is transferred to the BCU of each car through a network an electrical instruction line. The BCU includes an Electronic Brake Control Unit (EBCU) and a Pneumatic Brake Control Unit (PBCU). The EBCU is a microcomputer processor in charge of receiving the braking instruction, and calculating and distributing a braking force of pneumatic brake according to the braking instruction. A solenoid valve of the PBCU is controlled to operate to generate precontrol pressure of pneumatic brake, and the precontrol pressure is converted into brake cylinder pressure by means of a relay valve.

The existing brake control system of a high-speed train set requires the configuration of the BCU on each car, so the cost is high; and the EBCU and the PBCU are integrated in a box, so the volume is large. Besides, this train can operate after being connected to a passenger car adopting automatically pneumatic braking. Because the braking instruction is transmitted through a network, the transmission is limited to the network, and the brake system cannot be flexibly marshaled.

SUMMARY

To solve one of the above technical problems, the present application provides a centralized brake control method of a control car. The method may include the following operations:

a brake request of any car is received;

a real-time pressure of a train pipe of any car is received and a target pressure of the train pipe is calculated;

a pressure of the train pipe is controlled, through a main blast pipe, according to the brake request and the relationship between the real-time pressure of the train pipe and the target pressure of the train pipe.

In some examples, the process of calculating the target pressure of the train pipe may comprise: when the brake request is a common brake request, the target pressure of the train pipe corresponding to the brake grade is calculated according to a brake grade of the common brake request.

In some examples, the process of controlling, through the main blast pipe, the pressure of the train pipe according to the brake request and the relationship between the real-time pressure of the train pipe and the target pressure of the train pipe may include the following operations:

in response to that there is no brake request, punishment braking is in a released state, and the real-time pressure of the train pipe is lower than the target pressure, the main blast pipe is controlled to supply air to the train pipe, in response to that there is the brake request and the real-time pressure of the train pipe is higher than the target pressure, air is dischargeed from the train pipe; and in response to that there is the common brake request, a request level is unchanged, and the real-time pressure of the train pipe is equal to the target pressure, the main blast pipe is controlled to supplement air to the train pipe when a leakage is occurred in the train pipe.

In some examples, the brake request may be sent by the brake controller, the brake controller may be an automatic brake handle, and the brake controller at least includes an operating position and a reconnecting position.

In some examples, the process of controlling, through the main blast pipe, the pressure of the train pipe according to the brake request and the relationship between the real-time pressure of the train pipe and the target pressure of the train pipe may further include the following operations:

in response to that the brake controller is kept in the operating position within a preset time, the main blast pipe is controlled to supplement air to the train pipe; and in response to that the brake controller is in the reconnecting position and there is no emergency brake request, the pressure of the train pipe is not controlled.

In some examples, the method further includes that: a control signal is generated according to the brake request and the real-time pressure of the train pipe, and the control signal is sent to a solenoid valve; the main blast pipe is controlled, through the solenoid valve, to supply air to the train pipe or dischargee air from the train pipe.

To solve one of the above technical problems, the present application provides a centralized brake control system of a control car. The system includes: a pressure acquisition device and a train pipe control device. The pressure acquisition device acquires the pressure of a main blast pipe. A pressure signal output end of the pressure acquisition device is connected with a pressure signal input end of the train pipe control device. A brake signal input end of the train pipe control device is connected with a brake signal output end of a brake controller. The train pipe control device is pneumatically connected with the main blast pipe and the train pipe respectively by means of an air channel.

In some examples, the pressure acquisition device may include: a first pressure switch, a second pressure switch, and a third pressure switch; the second pressure switch and the third pressure switch are configured to acquire the pressure of the main blast pipe respectively; the pressure signal output ends of the first pressure switch, the second pressure switch and the third pressure switch are connected with the pressure signal input end of the train pipe control device at the same time.

In some examples, the pressure acquisition device may further include: a test port for checking a closure pressure and a compound pressure of each of the first pressure switch, the second pressure switch and the third pressure switch.

In some examples, the train pipe control device may include: an equalizing reservoir, a first cutout cock, a filter, a flowmeter, a first relief solenoid valve, a second relief solenoid valve, a first brake solenoid valve, a second brake solenoid valve, an charging solenoid valve, a neutral valve, a relay valve, an interception valve, a first emergency braking solenoid valve, a second emergency braking solenoid valve, an emergency braking air discharge valve, a throttle valve, and a second cutout cock.

The pressure signal output end of the pressure acquisition device is connected with an air inlet of the first relief solenoid valve, an air inlet of the second relief solenoid valve and an input port of the flowmeter through the first cutout cock.

An air outlet of the flowmeter is connected with an air inlet of the neutral valve.

An air outlet of the neutral valve is connected with a port E of the relay valve.

A port C of the relay valve is connected with an air inlet of the first brake solenoid valve, an e air inlet of the second brake solenoid valve, an air inlet of the equalizing reservoir, an air inlet of the charging solenoid valve, an air outlet of the first relief solenoid valve, and an air outlet of the second relief solenoid valve.

Air outlets of the first brake solenoid valve and the second brake solenoid valve are opened to the atmosphere.

A port O of the relay valve is connected with an air inlet of the interception valve.

An air outlet of the interception valve is connected with an air outlet of the charging solenoid valve, an air inlet of the first emergency braking solenoid valve, an air inlet of the second emergency braking solenoid valve, an air outlet of the second cutout cock, and the air inlet of the train pipe.

The air outlet of the first emergency braking solenoid valve is connected with an air outlet of the second emergency braking solenoid valve, a pilot control port of the emergency braking air discharge valve, and an air inlet of the second cutout cock.

An air outlet of the first emergency braking solenoid valve is connected with the air outlet of the second emergency braking solenoid valve, the pilot control port of the emergency braking air discharge valve, an air inlet of the emergency braking air discharge valve, and the air inlet of the second cutout cock.

An air inlet of the throttle valve is connected with the pilot control port of the emergency braking air discharge valve, and an air outlet of the throttle valve is connected with the air inlet of the emergency braking air discharge valve.

A third port of the first emergency braking solenoid valve is connected with a third port of the second emergency braking solenoid valve, and is connected to an explosion-proof device.

In some examples, the neutral valve may include: a two-position three-way solenoid valve and a two-position two-way solenoid valve; the air outlet of the flowmeter is connected with an air inlet of the two-position three-way solenoid valve and an air inlet of the two-position two-way solenoid valve; an air outlet of the two-position three-way solenoid valve is connected with a pilot control port of the two-position two-way solenoid valve; and an air outlet of the two-position two-way solenoid valve is connected with the port E of the relay valve.

In some examples, the interception valve includes: a two-position three-way solenoid valve and a two-position two-way solenoid valve; the port O of the relay valve is connected with an air inlet of the two-position three-way solenoid valve and an air inlet of the two-position two-way solenoid valve; an air outlet of the two-position three-way solenoid valve is connected with a pilot control port of the two-position two-way solenoid valve; and an air outlet of the two-position two-way solenoid valve is connected with the air outlet of the charging solenoid valve, the air inlet of the first emergency braking solenoid valve, the air inlet of the second emergency braking solenoid valve, the air outlet of the second cutout cock, and the air inlet of the train pipe.

In some examples, the train pipe control device may further include: the train pipe control device further comprises: a pressure reducing valve measurement point and a main blast pipe pressure sensor; the main blast pipe pressure sensor is provided on the pressure reducing valve measurement point, and is configured to acquire a pressure value of the main blast pipe.

In some examples, the train pipe control device may further include: a train pipe precontrol measurement point and a train pipe precontrol sensor. The train pipe precontrol sensor is provided on the train pipe precontrol measurement point, and is configured to acquire a pressure value of the equalizing reservoir.

In some examples, the train pipe control device may further include: a train pipe measurement point and a train pipe pressure sensor. The train pipe pressure sensor is provided on the train pipe measurement point, and is configured to acquire a pressure value of the train pipe.

In some examples, the system may further include an emergency air relief valve. The emergency air relief valve is connected with both the train pipe and the interception valve, and is configured to communicate the train pipe with an atmospheric channel when a pressure drop rate of the train pipe exceeds a predetermined value.

In some examples, the system may further include: an auxiliary control device, which is connected with a train control device and configured to supply air to an auxiliary device of a train using air.

To solve one of the above technical problems, the present application provides a brake control system of a high-speed train set. The system may include: the centralized brake control system of a control car, the brake controller, a brake control system of a power car, and an automatic electro-pneumatic brake.

The brake controller is configured to send a brake request to the centralized brake control system of a control car and the brake control system of a power car.

The brake control system of a power car is configured to control a pressure value generated by a train brake cylinder according to the brake request and the real-time pressure of the train pipe.

The automatic electro-pneumatic brakes are installed in the control car and a middle trailer car, and are configured to control an application and release of pneumatic braking of the train according to the real-time pressure of the train pipe.

In some examples, the system may further include a standby brake system, which is configured to control the pressure of the train pipe when at least one of the centralized brake control system of a control car or the brake control system of a power car malfunctions.

The present application has the following beneficial effects.

1. The present application controls, according to a brake request output by the brake controller and the detection of the real-time pressure of the train pipe, the pressure change of the train pipe, and a five-line control signal is used, so that flexible marshalling can be implemented.

2. The present application can set the brake control system merely in the control car, and there is no need to set the brake control system in other middle trailer cars, and the existing automatic electro-pneumatic brake can be used, so the installation space of the trailer car is saved, and the cost is reduced. Moreover, because the automatic brake control system is used to control the change of pressure of the train pipe, the train can operate after being connected to the passenger car adopting automatically pneumatic braking.

BRIEF DESCRIPTION OF DRAWINGS

The accompanying drawings described here are used for providing further understanding of the present application, and constitute a part of the present application. Schematic embodiments of the present application and description thereof are used for illustrating the present application and not intended to form an improper limit to the present application. In the accompanying drawings.

DETAILED DESCRIPTION

In order to make the technical solutions and advantages in embodiments of the present application clearer, the exemplary embodiments in the present application are further elaborated below in combination with the accompanying drawings. It is apparent that the described embodiments are only a part of the embodiments of the present application but not all. It is to be noted that the embodiments in the present application and the characteristics in the embodiments may be combined under the condition of no conflicts.

Figure 1:
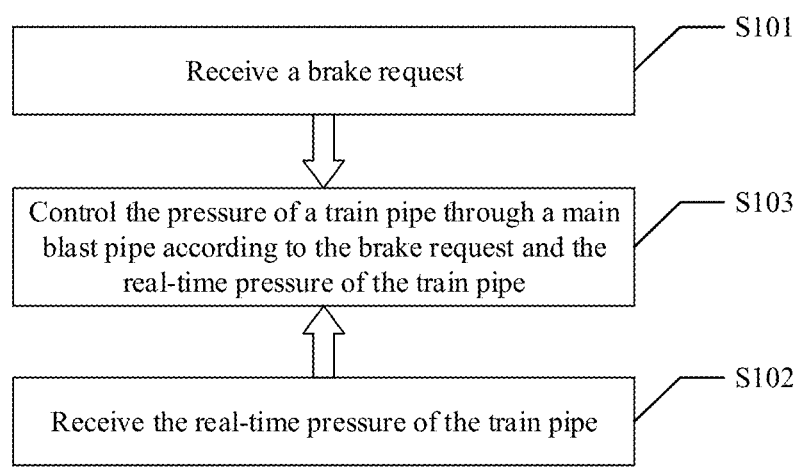
FIG. 1 is a flowchart of a centralized brake control method of a control car in the present application.

As illustrated in FIG. 1, an embodiment of the present application provides a centralized brake control method of a control car. The method includes the following operations.

At S101: a brake request is received.

Specifically, the brake request in the embodiment is sent by a brake controller. The brake controller is provided in both the control car and the power car of a train. The brake controller may be an automatic brake handle, and has successively an operating position, an initial-braking position, a braking zone, a full-braking position, a suppressing position, a reconnecting position and an emergency position along a direction away from the driver. The functions of these positions are as follows.

In the operating position, the train pipe controls the supply of air according to fixed pressure. The operating position is the position where the air supply and air release is performed during the braking of the train.

If the handle is set in the initial-braking position, the pressure of the train pipe is decreased by 50 kPa.

The braking zone starts from the initial-braking position and ends at the full-braking position. From the initial-braking position to the full-braking position, the pressure of the train pipe should decrease continuously, and the amount of pressure decrease is in linear correlation with the position of the handle.

If the handle is set in the full-braking position, the train pipe generates the maximum amount of pressure decrease of service braking (the pressure decreases to 360 kPa or 430 kPa).

The suppressing position is used for releasing a punishment braking. Before a punishment braking action is released, it is necessary to push the handle of the brake controller to the suppressing position and keep for 1 second, and then, the handle is pushed to the operating position. When the handle is pushed to the suppressing position, the amount of pressure decrease is the same as the amount of pressure decrease in the full-braking position.

When the handle is pushed from the suppressing position to the reconnecting position, the pressure of the train pipe should be controlled to linearly decrease from the maximum amount of pressure decrease of service braking to 0 kPa. After the handle is in the reconnecting position stably, the train pipe is controlled to dischargee air only when emergency braking.

The emergency position generates emergency braking, and the air of the train pipe is quickly dischargeed to 0.

At S102, the real-time pressure of the train pipe is received.

Specifically, the measurement of the real-time pressure of the train pipe is mainly realized by a train pipe pressure sensor. The train pipe pressure sensor provides continuous pressure data for controlling the pressure of the train pipe.

At S103, the pressure of the train pipe is controlled through a main blast pipe according to the brake request and the real-time pressure of the train pipe.

Specifically, three different braking forms can be generated according to the practical applications of the brake controller and the difference of the brake requests.

The first is service braking. The amount of pressure decrease of the train pipe is between the minimum effective amount of pressure decrease (50 kPa) and the maximum effective amount of pressure decrease (which is 140 kPa when the fixed pressure of the train pipe is 500 kPa, and is 170 kPa when the fixed pressure of the train pipe is 600 kPa), the service braking can be triggered by moving the handle of the brake controller to the braking zone by the driver.

The second is emergency braking. The emergency braking is triggered by setting the handle in the emergency position, or pressing an emergency braking button, or when there is an emergency braking request, or when an air dischargee rate of the train pipe exceeds 80 kPa/s. At this point, the pressure of the train pipe is controlled to decrease to 0 at a pressure decrease rate exceeding 80 kPa/s.

The third is punishment braking. The punishment braking is not a braking applied by the driver, and is automatically triggered according to the state of the car. According to the request grades, the punishment braking can be the emergency braking or the service braking.

In the case of service braking, according to a received brake grade, the target pressure of the corresponding train pipe is calculated, and the pressure of the train pipe is controlled, through the main blast pipe, according to the brake request and the relationship between the real-time pressure of the train pipe and the target pressure of the train pipe.

Specifically, the process of controlling, through the main blast pipe, the pressure of the train pipe according to the brake request and the relationship between the real-time pressure of the train pipe and the target pressure of the train pipe includes the following operations:

in response to that there is no brake request, the punishment brake is in a released state, and the real-time pressure of the train pipe is lower than the target pressure, air is supplied to the train pipe through the main blast pipe;

in response to that there is the brake request and the real-time pressure of the train pipe is higher than the target pressure, air is dischargeed from the train pipe;

in response to that there is the common brake request, a request level is unchanged, and the real-time pressure of the train pipe is equal to the target pressure, if the train pipe leaks, air is supplemented to the train pipe through the main blast pipe when a leakage is occurred in the train pipe;

in response to that the brake controller is kept in the operation position within the preset time, air is supplemented to the train pipe through the main blast pipe;

in response to that the brake controller is in the reconnection position and there is no emergency brake request, the pressure of the train pipe is not controlled.

The method of the embodiment further includes that: a control signal is generated according to the brake request and the real-time pressure of the train pipe, and the control signal is sent to a solenoid valve; the main blast pipe is controlled, through the solenoid valve, to supply air to the train pipe or dischargee air from the train pipe.

Specifically, the control signal is a five-line wire signal. The five-line wire signal is used for controlling the state of the solenoid valve in an electro-pneumatic brake which is installed in the control car and the middle trailer car, and assisting in the control of air supply and air dischargee of the train, and shortening braking response time. The electro-pneumatic brakes mainly include a model F8 electro-pneumatic brake and a model 104 electro-pneumatic brake. The model F8 electro-pneumatic brake includes a brake solenoid valve, a relief solenoid valve, and an emergency solenoid valve. The model 104 electro-pneumatic brake includes the brake solenoid valve, the relief solenoid valve, and a pressure maintaining solenoid valve. The five wires are respectively:

a brake wire which is used for controlling the state of the brake solenoid valve of the model F8 electro-pneumatic brake and the model 104 electro-pneumatic brake;

a release wire which is used for controlling the state of the relief solenoid valve of the model F8 electro-pneumatic brake and the model 104 electro-pneumatic brake;

a pressure maintaining wire which is used for controlling the state of the pressure maintaining solenoid valve of the model 104 electro-pneumatic brake;

an emergency wire which is used for controlling the state of the emergency solenoid valve of the model F8 electro-pneumatic brake, and serves as a check wire of the model 104 electro-pneumatic brake; and a negative power wire which is grounded.

Figure 2:
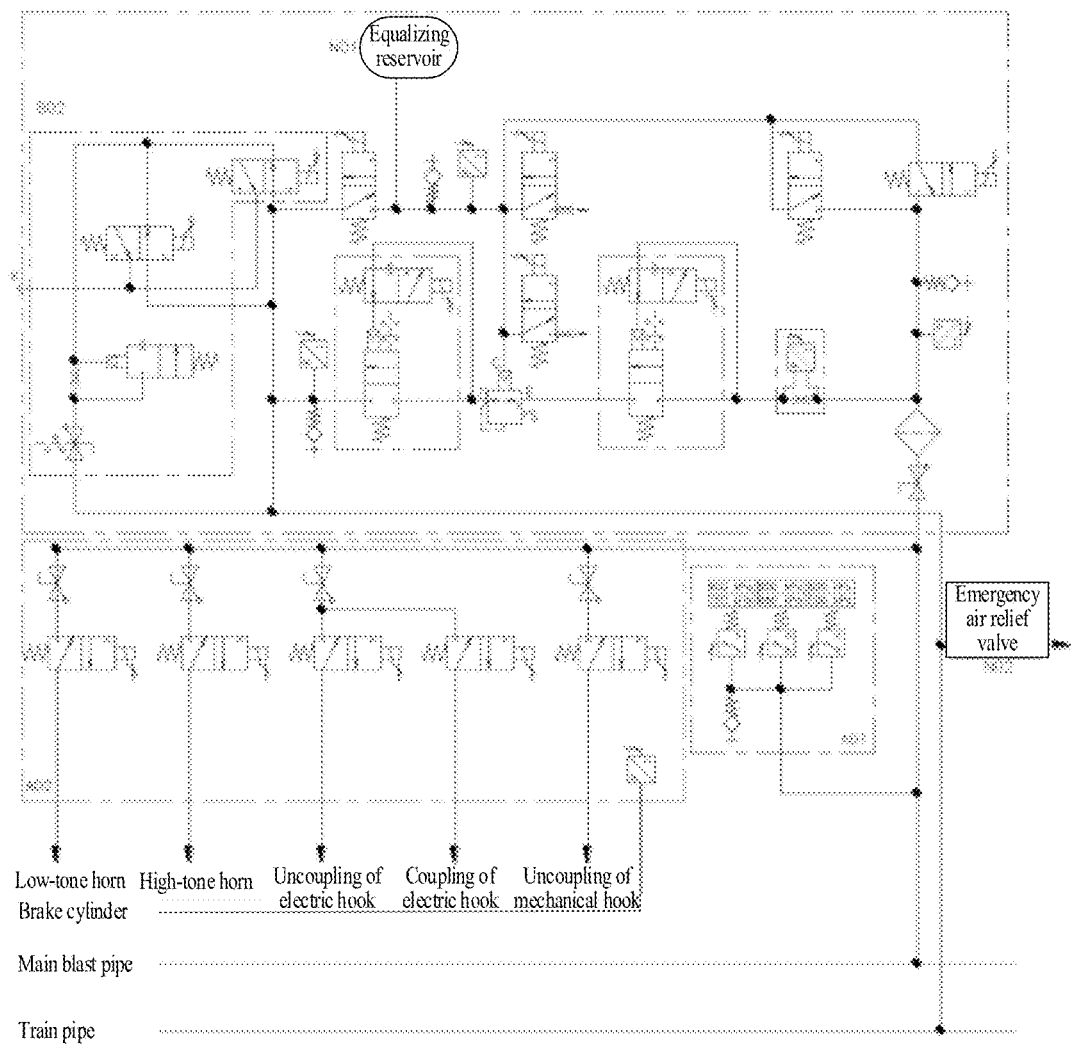
FIG. 2 is a principle diagram of a centralized brake control system of a control car in the present application.

Furthermore, the process of controlling the pressure of the train pipe according to the brake request and the real-time pressure of the train pipe at S103 is applied to a centralized brake control system of a control car as illustrated in FIG. 2. The centralized brake control system of a control car includes: a pressure acquisition device A01 and a train pipe control device B02. The pressure acquisition device A01 acquires the pressure of the main blast pipe. A pressure signal output end of the pressure acquisition device A01 is connected with a pressure signal input end of the train pipe control device B02. A brake signal input end of the train pipe control device B02 is connected with a brake signal output end of the brake controller. The train pipe control device B02 is pneumatically connected with the main blast pipe and the train pipe respectively by means of an air channel.

Figure 4:
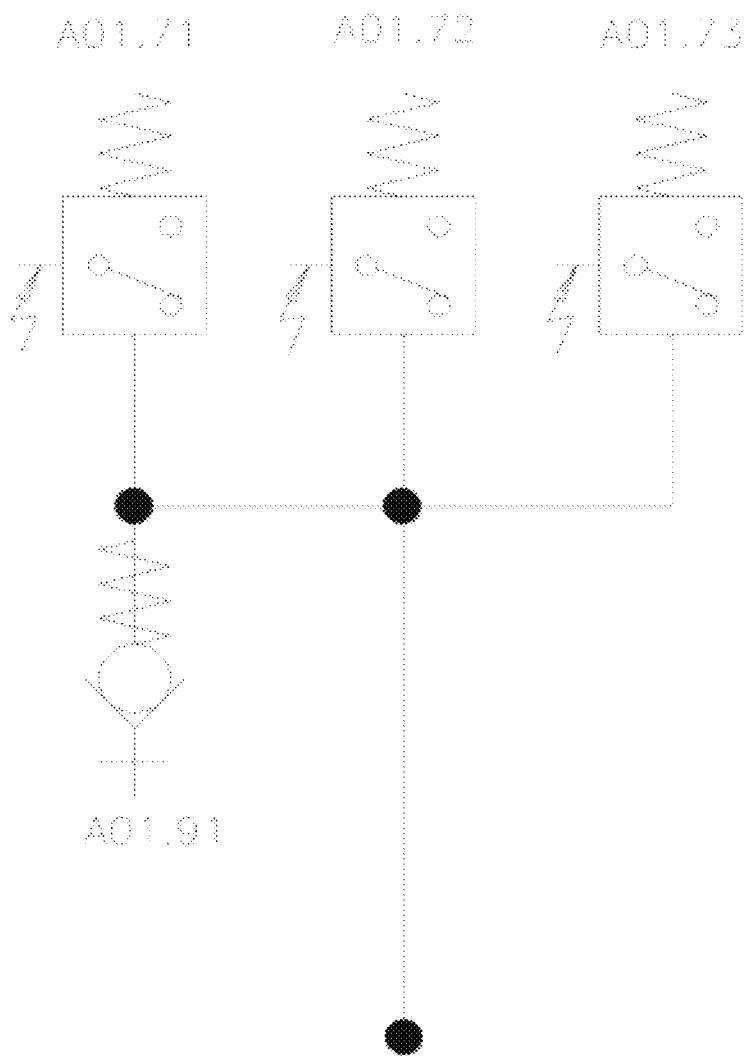
FIG. 4 is a principle diagram of a pressure acquisition device A01 in the present application.

Specifically, the pressure acquisition device A01 is configured to provide a pressure signal to an air compressor. As illustrated in FIG. 2 and FIG. 4, the pressure acquisition device A01 includes three pressure switches and one test ports. Closure pressure of the pressure switch A01.71 is 750 kPa (effective edge is falling edge), and reset pressure is 900 kPa (effective edge is rising edge). The closure pressure of the pressure switch A01.72 is 680 kPa (effective edge is falling edge), and the reset pressure is 900 kPa (effective edge is rising edge). The closure pressure of the pressure switch A01.73 is 500 kPa (effective edge is falling edge), and the reset pressure is 600 kPa (effective edge is rising edge).

When the pressure of the main blast pipe is lower than the closure pressure of the pressure switch, the pressure switch is closed, and a circuit is on; when the pressure is higher than the reset pressure of the pressure switch, the pressure switch is reset, and the circuit is off.

The test port A01.91 is configured to check the closure pressure and the reset pressure of the pressure switch.

Figure 3:
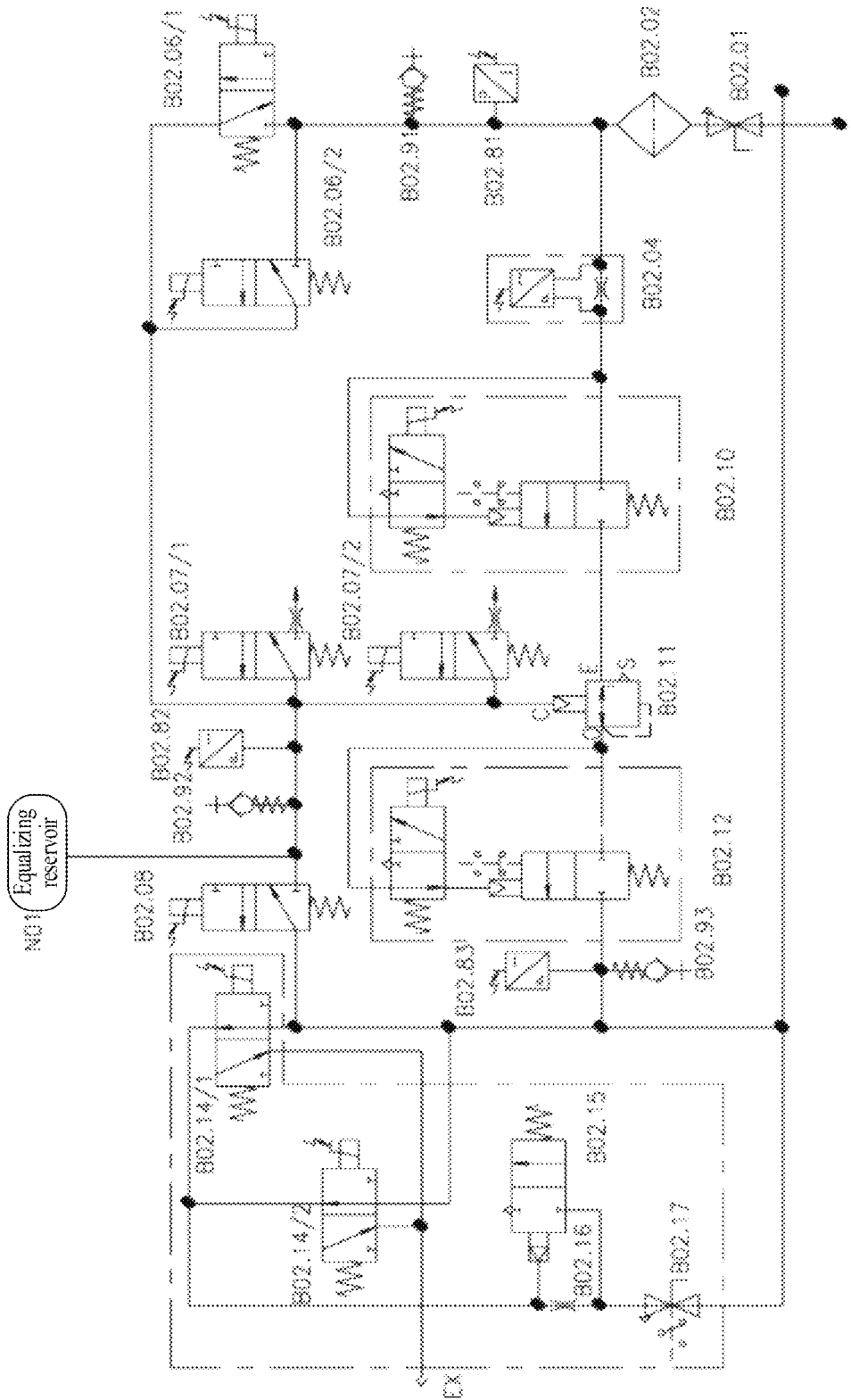
FIG. 3 is a principle diagram of a train pipe control device B02 in the present application.

As illustrated in FIG. 3, the train pipe control device B02 mainly consists of the following parts:

an equalizing reservoir N01, which is configured to control the change of pressure of the train pipe;

a first cutout cock B02.01, which is configured to control on and off states of the train pipe control device B02;

a filter B02.02, which is configured to clean compressed air provided for the train pipe by the main blast pipe;

a flowmeter B02.04, which is configured to monitor air supply flow of the train pipe;

a first relief solenoid valve B02.06/1, which is configured to control air supply of the equalizing reservoir N01;

a second relief solenoid valve B02.06/2, which is configured to control air supply of the equalizing reservoir N01, as a redundancy control;

a first brake solenoid valve B02.07/1, which is configured to control air dischargee of the equalizing reservoir N01;

a second brake solenoid valve B02.07/2, which is configured to control air dischargee of the equalizing reservoir N01, as a redundancy control;

an charging solenoid valve B02.08, which is configured to fast supply air to the train pipe when the braking is released completely;

a neutral valve B02.10, which is configured to cut off the air supplement performed by the main blast pipe to the train pipe when powered on;

a relay valve B02.11, which is configured to control the pressure change of the train pipe according to the pressure change of the equalizing reservoir N01, thereby completing the braking, the pressure maintaining and the release of the train;

an interception valve B02.12, which is configured to cut off a channel between the relay valve B02.11 and the train pipe during the reconnection;

a first emergency braking solenoid valve B02.14/1, which is configured to dischargee air from the train pipe when an emergency braking signal is received, and control pilot pressure of the emergency braking air dischargee valve B02.15;

a second emergency braking solenoid valve B02.14/2, which, as a redundant, is configured to dischargee air from the train pipe when the emergency braking signal is received, and control the pilot pressure of the emergency braking air dischargee valve B02.15;

an emergency braking air dischargee valve B02.15, which is configured to dischargee air from the train pipe when a pilot pressure drop rate exceeds 80 kPa/s;

a throttle valve B02.16, which is configured to limit the flow, and prevent the emergency braking air dischargee valve B02.15 from acting wrongly during service braking;

a second cutout cock B02.17, which is configured to cut out the function of the emergency valve of controlling the pressure of the train pipe;

a main blast pipe pressure sensor B02.81, which is configured to acquire the pressure of the main blast pipe;

a train pipe precontrol sensor B02.82, which is configured to acquire a pressure value of the equalizing reservoir N01;

a train pipe pressure sensor B02.83, which is configured to acquire the pressure of the train pipe;

a measurement point B02.91 for the pressure reducing valve, which is configured to detect the pressure value of a pressure entering the equalizing reservoir N01 through the pressure reducing valve;

a train pipe precontrol measurement point B02.92, which is configured to detect the pressure value of the equalizing reservoir N01; and a train pipe measurement point B02.93, which is configured to detect the pressure value of the train pipe.

Specifically, the pressure signal output end of the pressure acquisition device A01 is connected with an air inlet of the first relief solenoid valve B02.06/1, the air inlet of the second relief solenoid valve B02.06/2 and an input port of the flowmeter B02.04 through the first cutout cock B02.01.

An air outlet of the flowmeter B02.04 is connected with the air inlet of the neutral valve B02.10.

The air outlet of the neutral valve B02.10 is connected with the port E of the relay valve B02.11.

The port C of the relay valve B02.11 is connected with the air inlet of the first brake solenoid valve B02.07/1, the air inlet of the second brake solenoid valve B02.07/2, the air inlet of the equalizing reservoir N01, the air inlet of the charging solenoid valve B02.08, the air outlet of the first relief solenoid valve B02.06/1, and the air outlet of the second relief solenoid valve B02.06/2 at the same time.

The air outlets of the first brake solenoid valve B02.07/1 and the second brake solenoid valve B02.07/2 are opened to the atmosphere.

The port O of the relay valve B02.11 is connected with the air inlet of the interception valve B02.12.

The air outlet of the interception valve B02.12 is connected with the air outlet of the charging solenoid valve B02.08, the air inlet of the first emergency braking solenoid valve B02.14/1, the air inlet of the second emergency braking solenoid valve B02.14/2, the air outlet of the second cutout cock B02.17, and the air inlet of the train pipe.

The air outlet of the first emergency braking solenoid valve B02.14/1 is connected with the air outlet of the second emergency braking solenoid valve B02.14/2, the pilot control port of the emergency braking air discharge valve B02.15, the air inlet of the emergency braking air discharge valve B02.15, and the air inlet of the second cutout cock B02.17.

The air inlet of the throttle valve B02.16 is connected with the pilot control port of the emergency braking air discharge valve B02.15, and the air outlet of the throttle valve B02.16 is connected with the air inlet of the emergency braking air discharge valve B02.15.

The third port of the first emergency braking solenoid valve is connected with the third port of the second emergency braking solenoid valve, and is connected to an explosion-proof device.

The first emergency braking solenoid valve B02.14/1, the second emergency braking solenoid valve B02.14/2, the emergency braking air dischargee valve B02.15, the throttle valve B02.16 and the second cutout cock B02.17 form an emergency valve module.

Specifically, the compressed air of the train pipe comes from the main blast pipe, and flows to the train pipe through the relay valve B02.11. During the service braking, the pressure change of the train pipe is controlled by means of the relay valve B02.11. During the emergency braking, the pressure change of the train pipe is controlled by means of the emergency valve module and the relay valve B02.11.

The relay valve B02.11 controls the pressure of the train pipe by adjusting the pressure (precontrol pressure) of the equalizing reservoir N01. The relay valve B02.11 has four interfaces, namely a precontrol pressure port C connected to the equalizing reservoir N01, a compressed air inlet E connected to the main blast pipe, a compressed air outlet O connected to the train pipe and an air outlet S opened to the atmosphere. The precontrol pressure port C has a small diameter, and its pressure is easy to be controlled. The compressed air outlet O has a large diameter, and the compressed air in it is provided by the compressed air inlet E also having a large diameter, but its pressure is controlled by the precontrol pressure port C. When the pressure of the precontrol pressure port C is greater than the pressure of the compressed air outlet O, the compressed air inlet E is connected to the compressed air outlet O. When the pressure of the precontrol pressure port C is less than the pressure of the compressed air outlet O, the compressed air of the compressed air outlet O is dischargee into the atmosphere through the air outlet S. When the pressure of the precontrol pressure port C is equal to the pressure of the compressed air outlet O, the compressed air outlet O is not connected to the compressed air inlet E, the compressed air outlet O, and the air outlet S, and the relay valve B02.11 is in a pressure maintaining state.

The compressed air of the equalizing reservoir N01 comes from the main blast pipe. The brake control system compares the pressure of the equalizing reservoir N01 monitored by the train pipe pre-control sensor B02.82 with the target pressure, and controls the pressure of the equalizing reservoir N01 by opening or closing the first relief solenoid valve B02.06/1, the second relief solenoid valve B02.06/2, the first brake solenoid valve B02.07/1 and the second brake solenoid valve B02.07/2.

Components and principles of the relay valve B02.10 and the interception valve B02.12 are the same, and function in controlling connection and disconnection between the main blast pipe and the train pipe. The difference between the relay valve and the interception valve is that the neutral valve B02.10 controls the channel between the main blast pipe and the relay valve B02.11, and the interception valve B02.12 controls the channel between the relay valve B02.11 and the train pipe. In a normal operation process, the relay valve and the interception valve are kept in a communicated state when powered off, that is, the main blast pipe is allowed to supply air to the train pipe.

When some operations not needing air supplement of the train pipe, such as an air tightness test, are performed, the neutral valve B02.10 is powered on to close the channel for the main blast pipe to supply air to the train pipe. During the emergency braking, a BCU also closes the neutral valve B02.10 to prevent air supplement of the train pipe, which causes unexpected releasing. The neutral valve B02.10 carries two electric contact signals, one of which is used for controlling an indicator lamp in the cab, and the other is used for diagnosing the BCU.

When the control car exits from occupancy, the interception valve B02.12 is powered on, and the channel for the relay valve B02.11 to control the train pipe is closed. At this point, the air dischargee of the train pipe can be controlled only during the emergency braking. During the service braking, the train pipe cannot be controlled, and the air cannot be supplied to the train pipe.

For the emergency valve module, only during the emergency braking, the emergency braking air dischargee valve B02.15 is opened to fast dischargee air from the train pipe, and the pilot pressure of the emergency braking air dischargee valve B02.15 is controlled by the first emergency braking solenoid valve B02.14/1 and the second emergency braking solenoid valve B02.14/2; when the pilot pressure drop rate exceeds 80 kPa/s, the channel connecting the train pipe to the atmosphere is opened. The throttle valve B02.16 prevents the train pipe from the pressure drop during the service braking. The pressure drop of the train pipe causes the unexpected air dischargee of the emergency braking air dischargee valve B02.15. The second cutout cock B02.17 is configured to cut out, when the emergency valve module malfunctions, the function of the emergency valve module of controlling the train pipe. The second cutout cock B02.17 carries the electric contact signal, and its state is detected by the BCU.

Furthermore, the process that the train pipe control device B02 controls the pressure of the train pipe and generates a five-line control signal specifically includes the following operations.

1. When the Air is Supplied to the Train Pipe

The first relief solenoid valve B02.06/1 and the second relief solenoid valve B02.06/2 are powered on and opened; the first brake solenoid valve B02.07/1 and the second brake solenoid valve B02.07/2 are powered off and closed; the first emergency braking solenoid valve B02.14/1 and the second emergency braking solenoid valve B02.14/2 are powered off and opened; an output control release wire is powered on, and the brake wire, the pressure maintaining wire and the emergency wire are powered off.

If the signal received by the train pipe control device B02 is that the braking of high grade is changed into the braking of low grade, but there is still a brake request, the charging solenoid valve B02.08 is powered off and closed. The compressed air of the main blast pipe is supplied to the equalizing reservoir N01 by means of the first cutout cock B02.01, the filter B02.02, the first relief solenoid valve B02.06/1, and the second relief solenoid valve B02.06/2. After the train pipe control device B02 monitors through the pressure sensor that the pressure of the equalizing reservoir N01 increases to the target pressure, the first relief solenoid valve B02.06/1 and the second relief solenoid valve B02.06/2 are powered off and closed, and the air supply to the equalizing reservoir N01 is stopped. Because the precontrol pressure of the precontrol pressure port C of the relay valve B02.11 increases, the pressure of the precontrol pressure port C is greater than the pressure of the compressed air outlet O, the compressed air inlet E of the relay valve B02.11 is connected to the compressed air outlet O, and the compressed air of the main blast pipe is supplied to the train pipe by means of the flowmeter B02.04, the neutral valve B02.10, the relay valve B02.11 and the interception valve B02.12. When the pressure of the precontrol pressure port C is equal to the pressure of the compressed air outlet O, the relay valve B02.11 is closed to stop the air supply to the train pipe.

If the signal received by the train pipe control device B02 is completely releasing, that is, the handle of the brake controller is moved from the braking zone to the operating position, there is no any brake request. That is, when the train pipe needs to be supplied with air to reach a fixed pressure, the charging solenoid valve B02.08 is powered on and opened. The compressed air of the equalizing reservoir N01 can also be fast supplied to the train pipe by means of the charging solenoid valve B02.08, and the charging solenoid valve B02.08 is powered off and closed until the pressure sensor detects that the pressure of the train pipe achieves the fixed pressure.

2. When the Air is Dischargeed from the Train Pipe 2.1. The Air Dischargee of the Train Pipe in Case of a Service Braking Request The first brake solenoid valve B02.07/1 and the second brake solenoid valve B02.07/2 are controlled to be powered on and opened to the atmosphere. The compressed air of the equalizing reservoir N01 can be dischargeed to the atmosphere by means of the first brake solenoid valve B02.07/1 and the second brake solenoid valve B02.07/2, so that the compressed air pressure of the equalizing reservoir N01 decreases to the target pressure; at this point, the brake wire is powered on, and the release wire, the pressure maintaining wire and the emergency wire are powered off. After the BCU monitors through the pressure sensor that the pressure of the equalizing reservoir N01 decreases to the target pressure, the first relief solenoid valve B02.07/1 and the second relief solenoid valve B02.07/2 are powered off and closed, and the pressure of the equalizing reservoir N01 does not decrease any more.

Because the precontrol pressure of the precontrol pressure port C of the relay valve B02.11 decreases, the pressure of the precontrol pressure port C is less than the pressure of the compressed air outlet O, the compressed air outlet O of the relay valve B02.11 is connected to the air outlet S, and the compressed air of the train pipe is dischargeed to the atmosphere by means of the interception valve B02.12 and the air outlet S of the relay valve B02.11. When the pressure of the precontrol pressure port C is equal to the pressure of the compressed air outlet O, the relay valve B02.11 is closed, and the pressure of the train pipe does not decrease any more.

2.2. The Air Dischargee of the Train Pipe in Case of an Emergency Braking Request The first relief solenoid valve B02.06/1 and the second relief solenoid valve B02.06/2 are controlled to be powered off and closed, the neutral valve B02.10 is powered off and closed, and the main blast pipe does not supply air to the equalizing reservoir N01 and the train pipe.

The first emergency braking solenoid valve B02.14/1 and the second emergency braking solenoid valve B02.14/2 are controlled to be powered on and opened; the pilot pressure of the emergency braking air dischargee valve B02.15 is fast dischargeed to the atmosphere by means of the first emergency braking solenoid valve B02.14/1 and the second emergency braking solenoid valve B02.14/2; when the rate exceeds 80 kPa/s, the emergency braking air dischargee valve B02.15 is opened, and the compressed air of the train pipe is fast dischargeed to the atmosphere by means of the emergency braking air dischargee valve B02.15.

As a redundant control, the first brake solenoid valve B02.07/1 and the second brake solenoid valve B02.07/2 are powered on and connected to the atmosphere; the compressed air of the equalizing reservoir is dischargeed to the atmosphere by means of the first brake solenoid valve B02.07/1 and the second brake solenoid valve B02.07/2, so that the pressure of the equalizing reservoir N01 decreases to 0. Because there is no pressure at the precontrol pressure port C of the relay valve B02.11, the compressed air outlet O of the relay valve B02.11 is connected to the air outlet S, and the compressed air of the train pipe is dischargeed to the atmosphere by means of the interception valve B02.1 and the air outlet S of the relay valve B02.11, until the pressure of the train pipe decreases to 0.

There is further an emergency air-proof valve N02 provided on the train pipe. When the emergency air-proof valve N02 monitors that the pressure drop rate of the train pipe exceeds 80 kPa/s, the channel between the train pipe and the atmosphere is opened to accelerate the pressure drop of the train pipe.

During the emergency braking, the brake wire and the emergency wire are powered on all the time, and the release wire and the pressure maintaining wire are powered off.

3. When the Pressure of the Train is Maintained

The first brake solenoid valve B02.07/1 and the second brake solenoid valve B02.07/2 are controlled to be powered off and closed; the first emergency braking solenoid valve B02.14/1 and the second emergency braking solenoid valve B02.14/2 are powered off and opened; and the neutral valve B02.10 and the interception valve B02.12 are powered off and opened. The pressure maintaining wire is powered on, and the brake wire, the release wire, and the emergency wire are powered off.

If the train pipe control device B02 is in an air supplement state, when the train pipe leaks slightly, the pressure of the compressed air outlet O of the relay valve B02.11 decreases, the pressure of the precontrol pressure port C is greater than the pressure of the compressed air outlet O, the compressed air inlet E of the relay valve B02.11 is connected to the compressed air outlet O, and the compressed air of the main blast pipe is supplied to the train pipe by means of the flowmeter B02.04, the neutral valve B02.10, the relay valve B02.11 and the interception valve B02.12. When the pressure of the compressed air outlet O is equal to the pressure of the precontrol pressure port C, the relay valve B02.11 is closed to stop the air supply to the train pipe.

4. When the Pressure of the Train Pipe is Fixed

The first relief solenoid valve B02.06/1 and the second relief solenoid valve B02.06/2 are powered off and closed; the first brake solenoid valve B02.07/1 and the second brake solenoid valve B02.07/2 are controlled to be powered off and closed; the first emergency braking solenoid valve B02.14/1 and the second emergency braking solenoid valve B02.14/2 are powered off and opened; and the neutral valve B02.10 and the interception valve B02.12 are powered off and opened. The brake wire, the release wire, the pressure maintaining wire and the emergency wire are powered off.

If the train pipe control device B02 is in a state of allowing air supplement, when the train pipe leaks slightly, the pressure of the compressed air outlet O of the relay valve B02.11 decreases, the pressure of the precontrol pressure port C is greater than the pressure of the compressed air outlet O, the compressed air inlet E of the relay valve B02.11 is connected to the compressed air outlet O, and the compressed air of the main blast pipe is supplied to the train pipe by means of the flowmeter B02.04, the neutral valve B02.10, the relay valve B02.11 and the interception valve B02.12. When the pressure of the compressed air outlet O is equal to the pressure of the precontrol pressure port C, the relay valve B02.11 is closed to stop the air supply to the train pipe.

Figure 5:
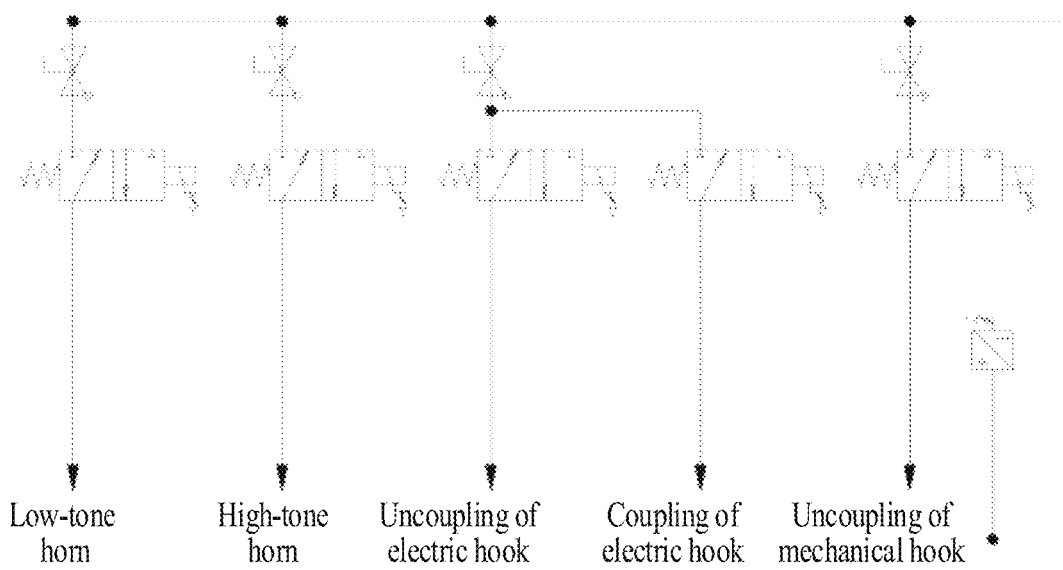
FIG. 5 is a principle diagram of an auxiliary control device A02 in the present application.

Furthermore, the centralized brake control system of a control car further includes an auxiliary control device A02. As illustrated in FIG. 2 and FIG. 5, the auxiliary control device A02 is connected with a train control device and configured to supply air for an auxiliary air use device of the train.

Specifically, the on and off states of the auxiliary control device A02 are controlled by the solenoid valve. The solenoid valve is in a state of being powered off and closed, is directly driven by an external circuit, and is not controlled by the brake control system. When a certain channel needs to be opened, the corresponding solenoid valve is directly driven. The solenoid valve can supply air for the air use device after opened. After the use of air is finished, a drive circuit is powered off, and the solenoid valve closes the channel of the downstream air use device.

In addition, the embodiment further provides a brake control system of a high-speed train set. The system includes: the centralized brake control system of a control car, the brake controller, the brake control system of a power car, and the automatic electro-pneumatic brake.

The brake controller is configured to send the brake request to the centralized brake control system of a control car and the brake control system of a power car.

The brake control system of a power car is configured to control the pressure value generated by the train brake cylinder according to the brake request and the real-time pressure of the train pipe.

The automatic electro-pneumatic brake is installed in the control car and the middle trailer car, and is configured to control the applying and releasing of pneumatic braking of the train according to the real-time pressure of the train pipe.

Specifically, the brake control system of a power car in the embodiment adopts the existing automatic brake control system controlled by a microcomputer of locomotive. The system mainly functions in: controlling the pressure change of the train pipe according to the brake request of the brake controller, and controlling the five-line wire signal needed by the automatic electro-pneumatic brake; controlling the corresponding pressure of the brake cylinder of the car according to the brake request and the pressure change of the train pipe; interacting information with a traction system of the train, sending the magnitude of regenerative braking to the traction system, and controlling the applying of pneumatic braking of the car according to a feedback of the traction system; responding to a request for parking brake instruction, controlling the applying and releasing of the parking braking; responding to a sanding instruction, controlling the car to sand or stop sanding; monitoring the pressure of the main blast pipe, and controlling the start and stop of the air compressor; analyzing and processing data, diagnosing the system, interacting information with a network, uploading state information and data, and controlling, according to a network signal, the brake system to generate a corresponding action. Because the brake control system of a power car is a comparatively mature system, so it will not be described too much here.

The automatic electro-pneumatic brake is provided in the control car and the middle trailer car. The on and off states of the solenoid valve of the electro-pneumatic brake can be controlled according to the five-line wire signal to control the applying and releasing of the electric brake of the car, at the same time, the applying and releasing of the car can be controlled according to the pressure change of the train pipe. As a redundant of the electric brake, when the electric brake malfunctions, the pneumatic brake can be applied directly.

Furthermore, the brake control system of a high-speed train set further includes a standby brake system. When the centralized brake control system of a control car and/or the brake control system of a power car malfunctions, the standby brake system controls the pressure change of the train pipe by means of a standby brake handle.

Figure 6:
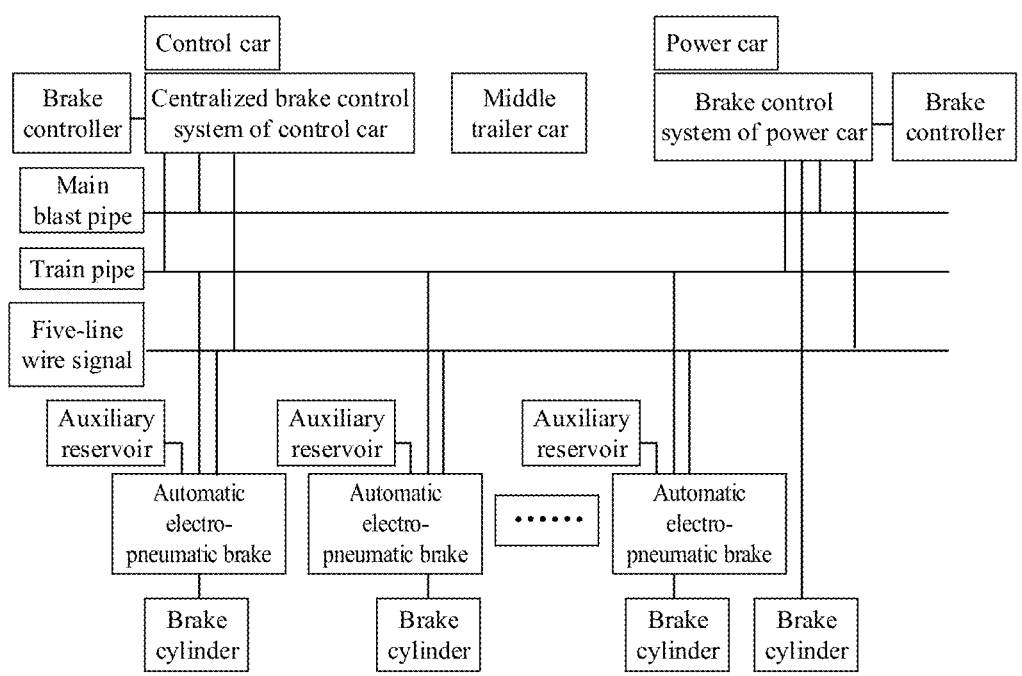
FIG. 6 is a principle diagram of a brake control system of a high-speed train set in the present application.

In addition, the embodiment also provides a train including the brake control system of a high-speed train set. As illustrated in FIG. 6, when the power car and/or the control car is occupied, the brake controller and the brake control system of the power car and/or the control car operate normally. The brake controller outputs the brake request. The brake control system controls the pressure of the train pipe and the five-line wire signal according to a braking instruction. The automatic electro-pneumatic brake in the control car and the middle trailer car controls, according to the five-line wire signal and the pressure of the train pipe, the brake cylinder of the car to generate the corresponding pressure.

It is apparent that those skilled in the art may make various modifications and changes to the present application without departing from departing from its spirit and scope. If these modifications and variations of the present application belong to the scope of the claims of the present application and its equivalent technology, the present application is intended to include these modifications and variations.

The invention claimed is:

1. A centralized brake control system of a control car, comprising: a pressure acquisition device for acquiring a pressure of a main blast pipe, and a train pipe control device;
   a pressure signal output end of the pressure acquisition device is connected with a pressure signal input end of the train pipe control device;
   a brake signal input end of the train pipe control device is connected with a brake signal output end of a brake controller; the train pipe control device is pneumatically connected with the main blast pipe and the train pipe by means of an air channel.

2. The centralized brake control system of a control car of claim 1, wherein the pressure acquisition device comprises: a first pressure switch, a second pressure switch, and a third pressure switch; the first pressure switch, the second pressure switch and the third pressure switch are configured to acquire the pressure of the main blast pipe respectively; pressure signal output ends of the first pressure switch, the second pressure switch and the third pressure switch are connected with the pressure signal input end of the train pipe control device at the same time.

3. The centralized brake control system of a control car of claim 2, wherein the pressure acquisition device further comprises: a test port for checking a closure pressure and a compound pressure of each of the first pressure switch, the second pressure switch and the third pressure switch.

4. The centralized brake control system of a control car of claim 3, wherein the train pipe control device comprises: an equalizing reservoir, a first cutout cock, a filter, a flowmeter, a first relief solenoid valve, a second relief solenoid valve, a first brake solenoid valve, a second brake solenoid valve, a charging solenoid valve a neutral valve, a relay valve, an interception valve, a first emergency braking solenoid valve, a second emergency braking solenoid valve, an emergency braking air discharge valve, a throttle valve, and a second cutout cock;
   the pressure signal output end of the pressure acquisition device is connected with an air inlet of the first relief solenoid valve, an air inlet of the second relief solenoid valve and an input port of the flowmeter through the first cutout cock;
   an air outlet of the flowmeter is connected with an air inlet of the neutral valve;
   an air outlet of the neutral valve is connected with an air inlet of the relay valve;
   a precontrol pressure port of the relay valve is connected with an air inlet of the first brake solenoid valve, an air inlet of the second brake solenoid valve, an air inlet of the equalizing reservoir, an air inlet of the charging solenoid valve, an air outlet of the first relief solenoid valve, and an air outlet of the second relief solenoid valve;
   air outlets of the first brake solenoid valve and the second brake solenoid valve are opened to the atmosphere;
   a compressed air outlet of the relay valve is connected with the air inlet of an interception valve;
   an air outlet of the interception valve is connected with an air outlet of the charging solenoid valve, an air inlet of the first emergency braking solenoid valve, an air inlet of the second emergency braking solenoid valve, an air outlet of the second cutout cock, and an air inlet of the train pipe;
   the air outlet of the first emergency braking solenoid valve is connected with an air outlet of the second emergency braking solenoid valve, a pilot control port of the emergency braking air discharge valve, and an air inlet of the second cutout cock;
   an air outlet of the first emergency braking solenoid valve is connected with the air outlet of the second emergency braking solenoid valve, the pilot control port of the emergency braking air discharge valve, an air inlet of the emergency braking air discharge valve, and the air inlet of the second cutout cock;
   an air inlet of the throttle valve is connected with the pilot control port of the emergency braking air discharge valve, and an air outlet of the throttle valve is connected with the air inlet of the emergency braking air discharge valve;
   a third port of the first emergency braking solenoid valve is connected with a third port of the second emergency braking solenoid valve, and is connected to an explosion-proof device.

5. The centralized brake control system of a control car of claim 4, wherein the neutral valve comprises: a two-position three-way solenoid valve and a two-position two-way solenoid valve; the air outlet of the flowmeter is connected with an air inlet of the two-position three-way solenoid valve and an air inlet of the two-position two-way solenoid valve; an air outlet of the two-position three-way solenoid valve is connected with a pilot control port of the two-position two-way solenoid valve; and an air outlet of the two-position two-way solenoid valve is connected with the compressed air inlet of the relay valve.

6. The centralized brake control system of a control car of claim 4, wherein the interception valve comprises: a two-position three-way solenoid valve and a two-position two-way solenoid valve; the compressed air outlet of the relay valve is connected with an air inlet of the two-position three-way solenoid valve and an air inlet of the two-position two-way solenoid valve; an air outlet of the two-position three-way solenoid valve is connected with a pilot control port of the two-position two-way solenoid valve; and an air outlet of the two-position two-way solenoid valve is connected with the air outlet of the charging solenoid valve, the air inlet of the first emergency braking solenoid valve, the air inlet of the second emergency braking solenoid valve, the air outlet of the second cutout cock, and the air inlet of the train pipe.

7. The centralized brake control system of a control car of claim 4, wherein the train pipe control device further comprises: a pressure reducing valve measurement point and a main blast pipe pressure sensor; the main blast pipe pressure sensor is provided on the pressure reducing valve measurement point, and is configured to acquire a pressure value of the main blast pipe.

8. The centralized brake control system of a control car of claim 4, wherein the train pipe control device further comprises: a train pipe precontrol measurement point and a train pipe precontrol sensor; the train pipe precontrol sensor is provided on the train pipe precontrol measurement point, and is configured to acquire a pressure value of the equalizing reservoir.

9. The centralized brake control system of a control car of claim 4, wherein the train pipe control device further comprises: a train pipe measurement point and a train pipe pressure sensor; the train pipe pressure sensor is provided on the train pipe measurement point, and is configured to acquire a pressure value of the train pipe.

10. The centralized brake control system of a control car of claim 4, further comprising: an emergency air relief valve; the emergency air relief valve is connected with both the train pipe and the interception valve, and is configured to communicate the train pipe with an atmospheric channel when a pressure drop rate of the train pipe exceeds a predetermined value.

11. The centralized brake control system of a control car of claim 4, further comprising: an auxiliary control device, which is connected with a train control device and configured to supply air to an auxiliary device of a train using air.

12. A brake control system of a high-speed train set, comprising: a centralized brake control system of a control car, a brake controller, a brake control system of a power car, and automatic electro-pneumatic brakes;
the centralized brake control system of a control car comprises a pressure acquisition device for acquiring a pressure of a main blast pipe, and a train pipe control device;
a pressure signal output end of the pressure acquisition device is connected with a pressure signal input end of the train pipe control device;
a brake signal input end of the train pipe control device is connected with a brake signal output end of a brake controller; the train pipe control device is pneumatically connected with the main blast pipe and the train pipe by means of an air channel;
the brake controller is configured to send a brake request to the centralized brake control system of a control car and the brake control system of a power car;
the brake control system of a power car is configured to control a pressure value generated by a train brake cylinder according to the brake request and a real-time pressure of the train pipe; and
the automatic electro-pneumatic brakes are installed in the control car and a middle trailer car, and are configured to control an application and release of pneumatic braking of the train according to the real-time pressure of the train pipe.

13. The brake control system of a power car of claim 12, further comprising a standby brake system, which is configured to control the pressure of the train pipe when at least one of the centralized brake control system of a control car or the brake control system of a power car malfunctions.

14. A centralized brake control method of a control car, comprising:
receiving a brake request of any car;
receiving a real-time pressure of a train pipe of any car and calculating a target pressure of the train pipe; and
controlling, through a main blast pipe, a pressure of the train pipe according to the brake request and the relationship between the real-time pressure of the train pipe and the target pressure of the train pipe.

15. The centralized brake control method of a control car of claim 14, wherein calculating a target pressure of the train pipe comprises: in response to that the brake request is a common brake request, calculating, according to a brake grade of the common brake request, the target pressure of the train pipe corresponding to the brake grade.

16. The centralized brake control method of a control car of claim 14, wherein controlling, through a main blast pipe, a pressure of the train pipe according to the brake request and the relationship between the real-time pressure of the train pipe and the target pressure of the train pipe comprises:
in response to that there is no brake request, punishment braking is in a released state, and the real-time pressure of the train pipe is lower than the target pressure, controlling the main blast pipe to supply air to the train pipe;
in response to that there is the brake request and the real-time pressure of the train pipe is higher than the target pressure, discharging air from the train pipe; and
in response to that there is the common brake request, a request level is unchanged, and the real-time pressure of the train pipe is equal to the target pressure, controlling the main blast pipe to supplement air to the train pipe when a leakage is occurred in the train pipe.

17. The centralized brake control method of a control car of claim 16, wherein the brake request is sent by the brake controller; the brake controller is an automatic brake handle, and the brake controller at least comprises an operating position and a reconnecting position.

18. The centralized brake control method of a control car of claim 17, wherein controlling a pressure of the train pipe according to the brake request and the relationship between the real-time pressure of the train pipe and the target pressure of the train pipe further comprises:
in response to that the brake controller is kept in the operating position within a preset time, controlling the main blast pipe to supplement air to the train pipe; and
in response to that the brake controller is in the reconnecting position and there is no emergency brake request, not controlling the pressure of the train pipe.

19. The centralized brake control method of a control car of claim 14, further comprising: generating a control signal according to the brake request and the real-time pressure of the train pipe and sending the control signal to a solenoid valve, and controlling, through the solenoid valve, the main blast pipe to supply air to the train pipe or discharge air from the train pipe.

20. The centralized brake control system of a control car of claim 4, wherein the first emergency braking solenoid valve, the second emergency braking solenoid valve, the emergency braking air discharge valve, the throttle valve and the second cutout cock form an emergency valve module.

\* \* \* \* \*